(12) United States Patent
Serhal

(10) Patent No.: US 8,905,295 B2
(45) Date of Patent: Dec. 9, 2014

(54) METHOD AND APPARATUS FOR ADDING VALUE TO A STORED VALUE ACCOUNT

(71) Applicant: Pierre Serhal, Panama (PA)

(72) Inventor: Pierre Serhal, Panama (PA)

( * ) Notice: Subject to any disclaimer, the term of this patent is extended or adjusted under 35 U.S.C. 154(b) by 50 days.

(21) Appl. No.: 13/677,833

(22) Filed: Nov. 15, 2012

(65) Prior Publication Data

US 2014/0131433 A1    May 15, 2014

(51) Int. Cl.
*G06F 17/00* (2006.01)
*G06K 19/06* (2006.01)
*G06Q 20/40* (2012.01)
*G06Q 20/32* (2012.01)
*G06Q 20/28* (2012.01)
*G06Q 20/34* (2012.01)

(52) U.S. Cl.
CPC ...... *G06K 19/06037* (2013.01); *G06Q 20/4012* (2013.01); *G06Q 20/3276* (2013.01); *G06Q 20/28* (2013.01); *G06Q 20/346* (2013.01)
USPC .......................................................... 235/375

(58) Field of Classification Search
USPC .................... 235/375, 451, 494, 379, 462.41; 472/491; 386/291; 705/34
See application file for complete search history.

(56) References Cited

U.S. PATENT DOCUMENTS

| | | | |
|---|---|---|---|
| 8,152,054 B2 * | 4/2012 | Bulawa et al. | 235/379 |
| 2002/0066783 A1 * | 6/2002 | Sawin | 235/379 |
| 2008/0191460 A1 * | 8/2008 | Blank | 283/72 |
| 2009/0204522 A1 * | 8/2009 | Meyer et al. | 705/34 |
| 2012/0074213 A1 * | 3/2012 | Martin | 235/375 |
| 2013/0166441 A1 | 6/2013 | Kobylkin et al. | |

OTHER PUBLICATIONS

U.S. Appl. No. 61/579,469, Egor Kobylkin et al.
U.S. Appl. No. 61/579,469, filed Dec. 22, 2011, Egor Kobylkin et al.

* cited by examiner

*Primary Examiner* — Daniel Hess
(74) *Attorney, Agent, or Firm* — Denko Coburn Lauff LLP

(57) ABSTRACT

An apparatus and method for adding value to a stored value account using a scanable stored value code are provided. Through the use of scanable stored value codes, the process of adding value to a stored value account can be improved. Stored value card containing scanable stored value codes provide advantages to holders of stored value accounts.

14 Claims, 5 Drawing Sheets

METHOD AND APPARATUS FOR ADDING VALUE TO A STORED VALUE ACCOUNT

BACKGROUND

In the area of stored value systems, a common problem is the manner in which account holders add value to their corresponding stored value accounts. This value may represent currency, but might also represent more abstract forms of value such as points, units, credits, or minutes. These stored value accounts could include pre-paid cellular phone accounts, prepaid credit card accounts, or balances stored at an online retailer. For various reasons, an account holder may desire to add value to his stored value account via retail purchases. These retail purchases may or may not be face-to-face. This may occur, for example, if the account holder may not be able to directly contact the maintainer of the stored value account. This may also occur if the account holder would like to add value to his stored value account using cash. Using cash may not be feasible unless the account holder can directly contact the maintainer of the stored value account. Accordingly, an account holder may desire to add value to his account via an intermediary such as a retailer.

Adding value to a stored value account may involve the following steps. The account holder selects a stored value card that corresponds to a specific type of account and the amount of value that the account holder would like to add. The account holder then purchases the stored value card via a retail transaction. Alternatively, information printed on a receipt or other stored value instrument may be used in place of or in addition to the stored value card. This retail transaction may include contact with the entity that maintains the account to authorize the stored value instrument. The account holder will then interface with the entity that maintains the stored value account to add value to his stored value account. This interfacing may be via the internet, via a phone call, via a text message or some forms of electronic communications. As part of this interfacing, the account holder must manually transmit a sequence of numbers that are printed on the stored value instrument. This sequence of numbers may be called a PIN. To account for the varying number of account holders, varying denominations, varying number of transactions, and to provide validation, this PIN must be a long sequence of numbers and could easily contain over 15 digits.

The manual process of entering a PIN to add value to the stored value account is rife with errors. In the case of a phone call, any error in the process of entering a 15 digit number may require restarting the manual entry process at the beginning, which might also result in an error. In addition to entry of the PIN itself, the account holder must either remember or determine the appropriate number to call or the appropriate number to send a message to, which is another source of error for the account holder. Moreover, this PIN may be obscured by a silvery scratch-off material that must first be removed to make the sequence of numbers visible. The scratching off process introduces at least two additional sources of error. The account holder might under-scratch the silvery material resulting in some numbers of the PIN being mistaken for other numbers. The account holder might continually attempt reentry of the PIN until this error is detected. The account holder might also over-scratch the silvery material and scratch away the numbers underneath. This problem cannot be easily corrected without contacting either the retailer or the maintainer of the stored value account or possibly both.

The current process of adding value to a stored value account is inherently time consuming and inefficient because of its manual nature. Because of human fallibility, that process is inevitably even more frustrating and inefficient at times. Such frustration and inefficiency reduces the value of the stored value system to both account holders and those that maintain such accounts.

DETAILED DESCRIPTION

By using scanable stored value codes, it is possible to improve the process of adding value to a stored value account and maintain the advantages of utilizing a retail transaction. A scanable stored value code may take many different forms and represents the information that might be stored within a PIN as well as computer-executable instructions that enhance the process of adding value to a stored value account.

One example might involve the process of adding value to a pre-paid cellphone account through the use of the corresponding cellphone. Performed manually, this process might include opening the dialing program, selecting a number to dial such as *233 followed by entry of a 15-digit-PIN. Through the use of a scanable stored value code, the cellphone may be instructed to perform all of the above steps automatically. The error inherent in the manual method can be avoided. Moreover, scanable stored value codes have the ability to include error correction. Thus, a scanable code that is only partially intact may be fully functional for purposes of adding value to the stored value account.

Rather than dial a number such as *233, the instructions may include sending a text message to a specific address. For example, the appropriate process may be to send a text message to 77777 with the sequence "ADD [Value Amount] [PIN Number]." Assuming that these instructions are printed on the face of the stored value card, the account holder might be confused as to the meaning of these instructions. For example, the account holder may be unclear as to whether the value amount should include currency symbols, "$50" vs. "50". Should the value amount include the brackets? "[$50]" vs. "[50]". Does the value amount correspond to the purchase price or the number of points? "[$50]" vs. "[1000]". Even if understood, the manual method still contains all of the error associated with manual entry. Through the use of scanable stored value codes, these problems can be avoided.

Figure 1A:
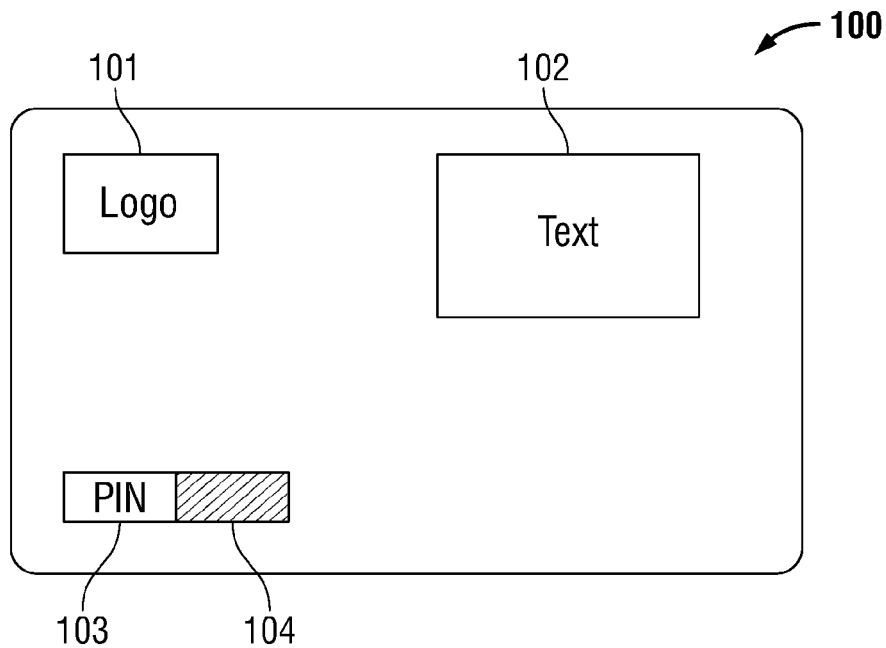
FIG. 1A illustrates a stored value card without a scanable stored value code area.

FIG. 1A illustrates a stored value card lacking a scanable stored value code. The stored value card 100 may contain various regions. Logo 101 may be present to identify the maintainer of the corresponding stored value account. Text area 102 may be present and could provide information to the account holder about the use of the card and the denomination of the card. Such information may be directed towards the account holder or the retailer's cashier. Text area 102 may also include disclaimers, contact phone numbers, and regulatory information. PIN area 103 includes the number sequence that can be used by the account holder to provide value to his stored value account. PIN area 103 need not be a pre-designated region, but might instead be defined by the location in which the PIN is present. PIN area 103 may be obscured by scratch-off material 104. FIG. 1A illustrates the scratch-off material 104 covering a portion of PIN area 103. The scratch-off material 104 may cover the entire PIN Area 103, a portion of PIN area 103, or be absent entirely. In addition, scratch-off material 104, if present, may be substituted by other materials such as tape, or the PIN 103 might be represented in ink that is visible using a special filter or ultra-violet light. Although FIG. 1A illustrates the features 101-104 being on a single side of stored value card 100, these features may be present on either side, split between sides, and/or duplicated on each side of stored value card 100. Features 101-104 are illustrated as being non-overlapping, but this is not necessary. Moreover, with the exception of PIN Area 103, the remaining features can be omitted. The locations and configurations of the various features are subject to the discretion of the stored value card manufacturer and may be driven by functional as well as aesthetic considerations.

Figure 1B:
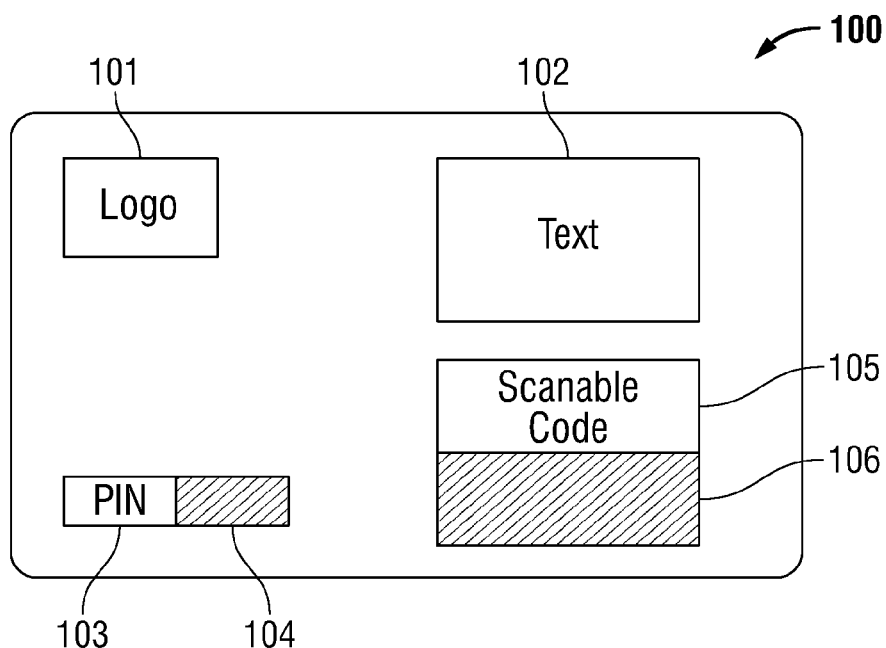
FIG. 1B illustrates a stored value card with a scanable stored value code area.

FIG. 1B illustrates a stored value card with a scanable stored value code. FIG. 1B contains the same features as FIG. 1A with the addition of a scanable stored value code area 105 and a corresponding scratch-off material 106. Much like PIN Area 103, scanable stored value code area 105 is defined by the region that contains the scanable stored value code but is otherwise unconstrained. Because FIG. 1B includes a scanable stored value code, it may be desirable to include information about the scanable stored value code in text area 102. Text area 102 might also include information regarding the purpose of the scanable stored value code and information regarding how to obtain software useful in scanning scanable stored value codes. The location of scanable stored value code area 105 is at the discretion of the stored value card manufacturer. FIG. 1B illustrates an embodiment including both a numeric PIN as well as a scanable stored value code. However, the inclusion of PIN Area 103 and scratch-off material 104 are present for purposes of backwards compatibility. Moreover, because the stored value card illustrated in FIG. 1B includes both a PIN and a scanable stored value code, an account holder has the option of using either one. In addition, the presence of both provides the ability to verify that the PIN matches the information contained in the scanable stored value code. However, at the discretion of the stored value card manufacturer, PIN area 103 and scratch-off material 104 can be entirely omitted. With the exception of scanable stored value code area 105 the remaining features are optional.

Figure 2A:
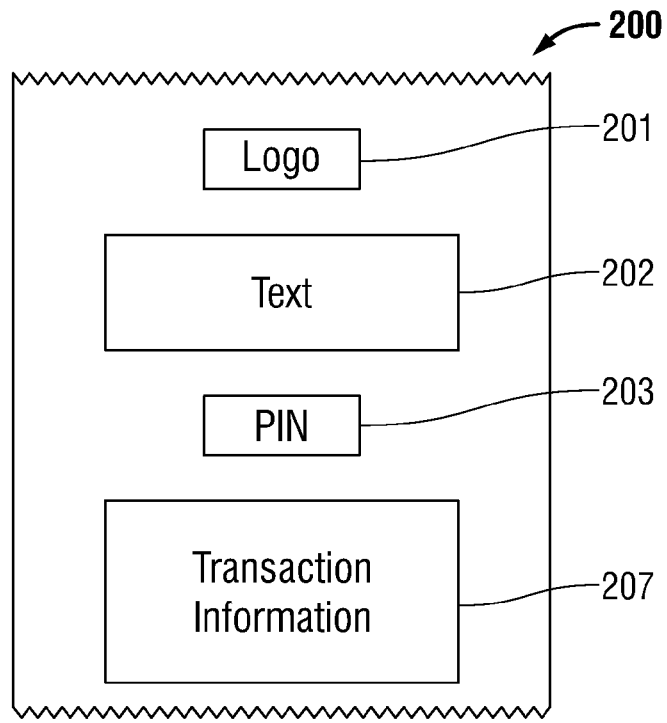
FIG. 2A illustrates a stored value instrument without a scanable stored value code area.

FIG. 2A illustrates an alternate embodiment utilizing information printed on a sales receipt 200. Rather than or in addition to purchasing a stored value card, the account holder may receive a receipt containing the same information that might otherwise be printed on a stored value card, such as stored value card 100. This may be desirable if the account holder wishes to add value to his stored value account using nonstandard value amount, such as $33.17 or 178 points, for example, or even standard value amounts such as $100.00 or 1000 points for example. Similar to FIG. 1A, sales receipt 200 contains a logo 201, instructions 202, and PIN area 203. Because it is a sales receipt, sales receipt 200 may also include transaction information 207 as might commonly be found on a sales receipt. As described above with respect to FIG. 1A, the features can be arranged in whatever manner is desired by the retailer. Except for PIN area 203, the remaining features can be omitted. Moreover, because a sales receipt is commonly printed on paper, the various regions can be easily segregated via scissors or perforations, for example.

Figure 2B:
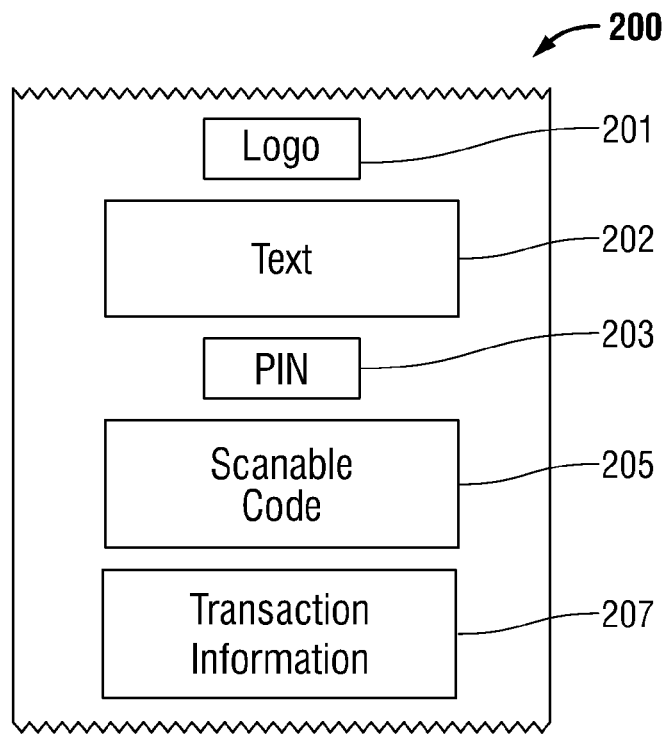
FIG. 2B illustrates a stored value instrument with a scanable stored value code area.

FIG. 2B illustrates an embodiment utilizing the same features as FIG. 2A with the addition of a scanable stored value code area 205. The sales receipt 200 illustrated in FIG. 2B has the same features and flexibility as FIG. 2A. With the exception of scanable stored value code area 205, the remaining features can be omitted including PIN area 203 in this embodiment.

The embodiments illustrated in FIGS. 2A and 2B need not be printed on paper. A retailer might also utilize a machine that prints scanable stored value codes on some other instrument as needed. For example, scanable stored value codes might be printed directly inside a birthday card. A retailer might also print a stored value card 100 with a scanable stored value code area 105 on demand. Alternatively, a scanable stored value code might be included as part of an e-mail transmission or other electronic document. A person of ordinary skill in the art would be able to affix a scanable stored value code to whatever instrument might be desired without undue experimentation.

Figure 3A:
FIGS. 3A, 3B, 3C, 3D and 3E illustrate examples of scanable stored value codes.
Figure 3B:
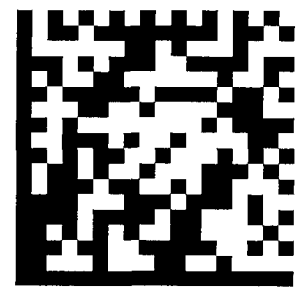
Figure 3C:
Figure 3D:

FIG. 3A illustrates a QR code with instructions to dial *233 followed by a 2 second pause, followed by the 15-digit PIN: 255994677976397. (i.e., "*233,255994677976397"). When scanned by the appropriate device, such as a cellular telephone, this will instruct the cell phone to perform these instructions. Depending on the configuration of the cell phone utilized, execution of these instructions may require confirmation by the account holder. FIG. 3B illustrates those same instructions using the data matrix format. FIG. 3C illustrates a QR code with instructions to send a text message to the number "77777" with the message "ADD 255994677976397". FIG. 3D illustrates a QR code with instructions to send an e-mail message to "fire@walk.with.me" with the subject: "ADD" with the message body "255994677976397". NOTE: The PIN: "255994677976397" is used solely for purposes of example and may or may not be usable to add value to any particular stored value account.

Figure 3E:
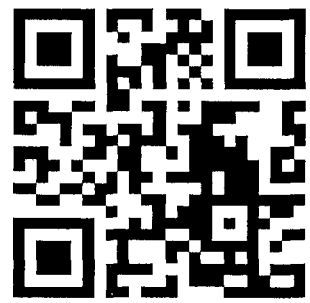

The scanable stored value code may contain only a subset of the information necessary to add value to a stored value account and may be supplemented with instructions or information already present on the cell phone. This might be done for identification reasons, for example. Telephone and text message communication inherently includes identification of the originating telephone number. If the account holder uses the cell phone whose account he would like to add value to, identification of the account holder is easy. However, in the case of e-mail, the account holder may have multiple e-mail addresses and thus the originating e-mail address may be insufficient to match the account holder with his stored value account. Because this information is unique to the account holder, it cannot be easily represented on a preprinted stored value card. Accordingly, the e-mail message illustrated in FIG. 3D might be supplemented with the telephone number of the account holder's cell phone. The instruction to make this supplement may be located on the cell phone itself and not within the scanable code. In the case of FIGS. 2A and 2B and other systems that print scanable stored value codes on demand, this information can be added at the time of purchase, thus all of the instructions necessary to add value to the stored value account via e-mail can be embedded in the code itself. FIG. 3E illustrates a QR code like FIG. 3D that further includes the telephone number "555-555-5555". Because of security concerns associated with e-mail communication, additional information may also be needed for purposes of authentication.

FIGS. 3A, 3B, 3C, 3D, and 3E are merely examples of scanable stored value codes that can be used in the disclosed embodiment but do not limit the range of possible scanable stored value codes. Scanable stored value codes other than QR codes can be used and may include more or less information than a PIN.

Figure 4:
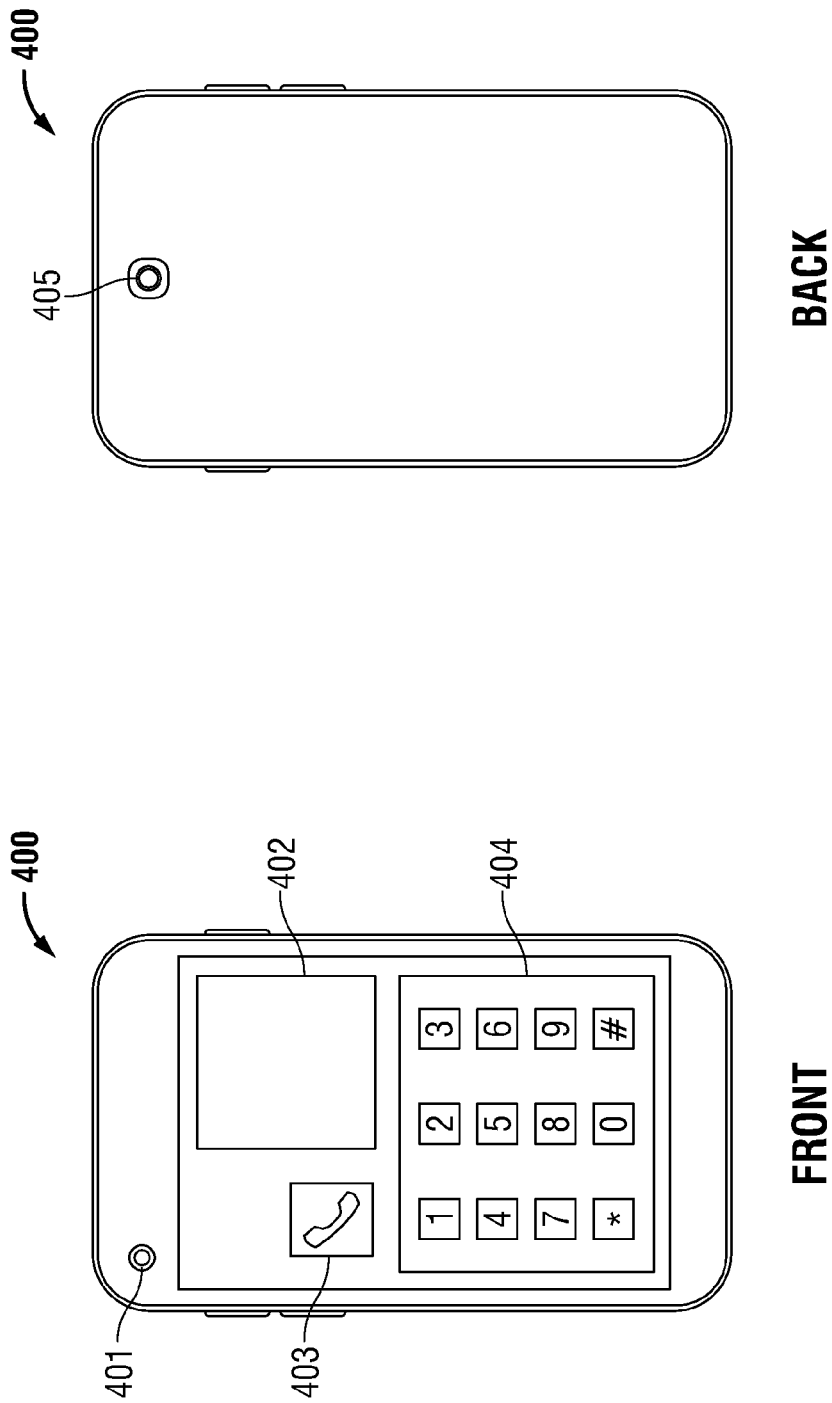
FIG. 4 illustrates an example of a device that may be used to add value to a stored value account using a scanable stored value code.

FIG. 4 illustrates a device that can be used to scan a scanable stored value instrument, specifically a cellular telephone. FIG. 4A illustrates the front of cellular telephone 400 which contains camera 401, screen 402, dial button 403 and keypad 404. Using camera 401, cellular telephone 400 can scan a scanable stored code to determine the instructions necessary to add value to a stored value account. Dial button 403 and/or keypad 404 can be used to confirm execution of the scanned instructions or to provide additional information that may be needed. FIG. 4B illustrates the back of cellular telephone and illustrates camera 405. Camera 405 can be used to scan scanable codes while the account holder is able to view screen 402 which may contain useful information in adding value to the stored value account. Using the appropriate software, the cameras 401 and 405 can be used to scan and interpret scanable stored value codes such as the ones illustrated in FIGS. 3A, 3B, 3C, 3D, and 3E. Although cellular phone 400 is illustrated as using cameras, a suitable device may include a device dedicated to scanning these codes that may be integrated with cellular phone 400 or coupled with it via wires or wirelessly using technologies such as Bluetooth, for example.

FIG. 4 is merely an example of device capable of scanning scanable stored value codes. Scanning of scanable stored value codes may also be accomplished via the use of desktop computers, laptop computers, or hardware especially designed for this purpose. Specialized hardware might include a laser scanners, tablet computers, or digital cameras, for example. Additionally, scanning of scanable stored value codes may be accomplished via kiosks or similar stations.

Figure 5:
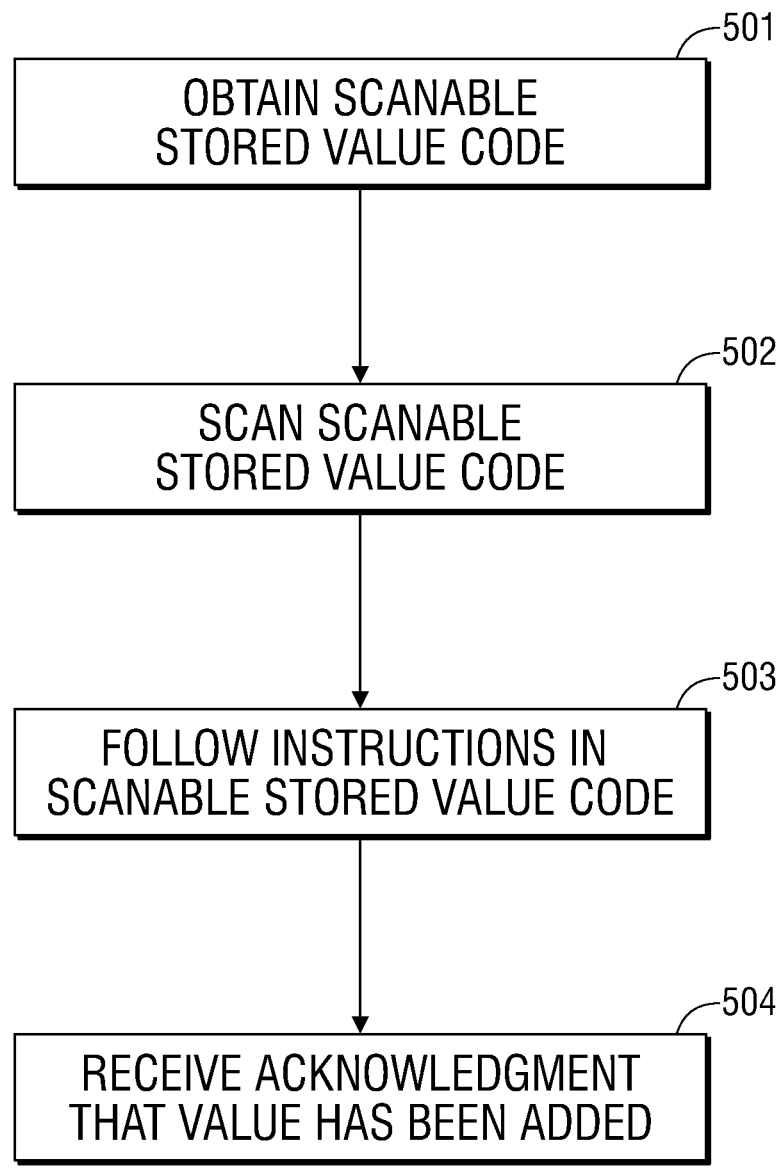
FIG. 5 is a flow chart illustrating a method of adding value to a stored value account using a scanable stored value code.

FIG. 5 illustrates a flow chart that might be used with the disclosed embodiments. Step 501 involves obtaining a scanable stored value code. The obtained scanable stored value code may take the forms illustrated in FIGS. 1B and 2B. However, the code may be obtained via e-mail or other electronic forms of communications. For example, the code might be displayed on the screen of a computer and then scanned by a device such as the one illustrated in FIG. 4. In addition, step 501 may optional include an authorization step. To reduce the value of theft, retailers may authorize stored value cards at the time of purchase. Once the scanable stored value code is obtained and authorized, if necessary, step 502 involves scanning the scanable stored value code. Step 502 may be accomplished via general-purpose scanning software or via special-purpose scanning software. The software must be able to interpret the PIN and instructions encoded in the scanable stored value code. For example, QR codes utilize a standard that describes the format of information encoded using this format. Other formats can be decoded in a similar fashion. Once the instructions and PIN are interpreted by step 502, the scanning device executes the instructions embodied in the scanable stored value code. Such instructions may include instructions to dial a specific number, send a text message, send an e-mail, or include an instruction to open a specific application and send information to this application. The instructions including transmitting the PIN to the entity that maintains the stored value account. Depending on the configuration of the scanning device, the instructions may require a final confirmation step, although such confirmation is not necessary. Step 503 involves following the instructions scanned in step 502. This will typically involve transmitting information to the entity that maintains the associated stored value account. Upon receipt, the maintainer of the stored value account should update the account holder's account to reflect the increase in value in accordance with the information represented by the PIN. Optionally, step 503 will be followed by receipt of an acknowledgement as a step 504. Any such acknowledgement may include identification of the account holder's account, the value added by the transaction, the current value in the account holder's account or any other information that might be useful to the account holder.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A stored value instrument comprising:
a human-readable code representing value to be added to a stored value account;
a scanable stored value code obscured by a removable opaque material, the scanable stored value code comprising the information represented by the human-readable code and instructions related to use of the information represented by the human-readable code.

2. The stored value instrument of claim 1, wherein the scanable stored value code is affixed on a card.

3. The stored value instrument of claim 1, wherein the scanable stored value code is represented on paper.

4. The stored value instrument of claim 1, wherein the scanable stored value code is a QR code.

5. The stored value instrument of claim 1, wherein the stored value account is a pre-paid cellular telephone account.

6. The stored value instrument of claim 1, wherein the stored value account is a gift card balance.

7. The stored value instrument of claim 1, wherein the scanable stored value code is affixed to a sales receipt.

8. The stored value instrument of claim 1, wherein the scanable stored value code is part of an electronic communication.

9. A stored value instrument comprising:
a human-readable code representing value that can be added to stored value account, wherein the human-readable code is obscured by a removable opaque material; and
a scanable stored value code comprising the information represented by the human-readable code and instructions related to use of the information represented by the human-readable code; wherein the scanable stored value code is obscured by a removable opaque material.

10. The stored value instrument of claim 9, wherein the scanable stored value code is affixed on a card.

11. The stored value instrument of claim 9, wherein the opaque materials can be scratched off.

12. The stored value instrument of claim 9, wherein the scanable stored value code is a QR code.

13. The stored value instrument of claim 9, wherein the stored value account is a pre-paid cellular telephone account.

14. The stored value instrument of claim 9, wherein the stored value account is a gift card balance.

* * * * *